United States Patent
Manabe et al.

(10) Patent No.: US 11,271,221 B2
(45) Date of Patent: Mar. 8, 2022

(54) ELECTROCHEMICAL REACTION CELL STACK, INTERCONNECTOR-ELECTROCHEMICAL REACTION UNIT CELL COMPOSITE, AND METHOD FOR MANUFACTURING ELECTROCHEMICAL REACTION CELL STACK

(71) Applicant: MORIMURA SOFC TECHNOLOGY CO., LTD., Komaki (JP)

(72) Inventors: Kenta Manabe, Nagoya (JP); Takeshi Ohno, Nagoya (JP)

(73) Assignee: MORIMURA SOFC TECHNOLOGY CO.. LTD., Komaki (JP)

( * ) Notice: Subject to any disclaimer, the term of this patent is extended or adjusted under 35 U.S.C. 154(b) by 283 days.

(21) Appl. No.: 16/618,481

(22) PCT Filed: May 31, 2018

(86) PCT No.: PCT/JP2018/020957
§ 371 (c)(1),
(2) Date: Dec. 2, 2019

(87) PCT Pub. No.: WO2018/225617
PCT Pub. Date: Dec. 13, 2018

(65) Prior Publication Data
US 2020/0099065 A1    Mar. 26, 2020

(30) Foreign Application Priority Data

Jun. 6, 2017 (JP) .............................. JP2017-111362

(51) Int. Cl.
*H01M 8/0247* (2016.01)
*H01M 8/0273* (2016.01)
(Continued)

(52) U.S. Cl.
CPC ............. *H01M 8/0247* (2013.01); *C25B 1/04* (2013.01); *C25B 9/73* (2021.01); *H01M 8/0202* (2013.01);
(Continued)

(58) Field of Classification Search
None
See application file for complete search history.

(56) References Cited

U.S. PATENT DOCUMENTS 6,670,068 B1 * 12/2003 Diez .................. H01M 8/0273
                                                             429/457
2003/0017377 A1    1/2003 Diez
(Continued)

FOREIGN PATENT DOCUMENTS

DE    10 2015 222 245 A1    5/2017
EP         1 278 258 A2    1/2003
(Continued)

OTHER PUBLICATIONS

International Search Report dated Jul. 10, 2018 by the International Searching Authority in counterpart International Patent Application No. PCT/JP2018/020957.
(Continued)

*Primary Examiner* — Jeremiah R Smith
(74) *Attorney, Agent, or Firm* — Sughrue Mion, PLLC

(57) ABSTRACT

An electrochemical reaction cell stack including a plurality of unit cells and flat plate-shaped electrically conductive members arranged in a first direction. The electrically conductive members include: a first member having a first surface including a first flat portion and a protruding portion and a second member both located on the first side of the first member in the first direction, the second member having a second surface facing the first surface and including a second flat portion and a recessed portion facing the pro-
(Continued)

truding portion. The thickness of the second member is larger than the thickness of the first member in the first direction. The depth of the recessed portion of the second member from the second flat portion is larger than the protruding length of the protruding portion of the first member from the first flat portion in the first direction.

10 Claims, 9 Drawing Sheets

(51) Int. Cl.
  *H01M 8/12* (2016.01)
  *C25B 1/04* (2021.01)
  *C25B 9/73* (2021.01)
  *H01M 8/0202* (2016.01)
  *H01M 8/0206* (2016.01)
  *H01M 8/0256* (2016.01)
(52) U.S. Cl.
  CPC ........... *H01M 8/0273* (2013.01); *H01M 8/12* (2013.01); *H01M 8/0206* (2013.01); *H01M 8/0256* (2013.01)

(56) References Cited

U.S. PATENT DOCUMENTS

| | | |
|---|---|---|
| 2005/0147865 A1 | 7/2005 | Diez |
| 2005/0170111 A1 | 8/2005 | Diez |
| 2005/0170231 A1 | 8/2005 | Diez |
| 2005/0191538 A1 | 9/2005 | Diez |
| 2005/0233196 A1 | 10/2005 | Diez |
| 2006/0068261 A1* | 3/2006 | Bourgeois ........... H01M 8/2432 429/456 |
| 2009/0325037 A1* | 12/2009 | Hood ................... H01M 8/0276 429/457 |
| 2014/0051009 A1* | 2/2014 | Ohno ................... H01M 8/2484 429/482 |
| 2014/0057192 A1* | 2/2014 | Ohno ................... H01M 8/2432 429/444 |
| 2015/0030949 A1* | 1/2015 | Ishikawa ................. F28F 3/086 429/434 |
| 2015/0372318 A1* | 12/2015 | Miyabata .............. H01M 8/248 429/470 |
| 2018/0323448 A1 | 11/2018 | Manabe et al. |

FOREIGN PATENT DOCUMENTS

| | | | | |
|---|---|---|---|---|
| JP | 2003-317743 A | | 11/2003 | |
| JP | 2015-088265 | * | 5/2015 | ............ Y02E 60/50 |
| JP | 2015-159106 A | | 9/2015 | |
| WO | 2017/073530 A1 | | 5/2017 | |

OTHER PUBLICATIONS

Communication dated Feb. 1, 2021 issued by the European Patent Office in application No. 18813366.4.

* cited by examiner

ELECTROCHEMICAL REACTION CELL STACK, INTERCONNECTOR-ELECTROCHEMICAL REACTION UNIT CELL COMPOSITE, AND METHOD FOR MANUFACTURING ELECTROCHEMICAL REACTION CELL STACK

CROSS REFERENCE TO RELATED APPLICATIONS

This application is a National Stage of International Application No. PCT/JP2018/020957, filed on May 31, 2018, which claims priority from Japanese Patent Application No. 2017-111362, filed on Jun. 6, 2017.

TECHNICAL FIELD

A technique disclosed in the present specification relates to an electrochemical reaction cell stack.

BACKGROUND ART

One known type of fuel cell that generates electricity by utilizing an electrochemical reaction between hydrogen and oxygen is a solid oxide fuel cell (hereinafter referred to as an "SOFC") including an electrolyte layer containing a solid oxide. Generally, SOFCs are used as a fuel cell stack including a plurality of unit cells arranged in a prescribed direction (hereinafter referred to as an "arrangement direction"). Each of the unit cells includes an electrolyte layer and further includes a cathode and an anode that face each other in the arrangement direction with the electrolyte layer therebetween.

The fuel cell stack further includes a plurality of electrically conductive members arranged in the arrangement direction. For example, the fuel cell stack includes, as the electrically conductive members, separators each separating a cathode chamber to which a corresponding cathode is exposed and an anode chamber to which a corresponding anode is exposed from each other, interconnectors each adjacent to a corresponding separator in the arrangement direction and exposed to a corresponding cathode or anode chamber, and frame members each disposed between a corresponding separator and a corresponding interconnector.

PRIOR ART DOCUMENT

Patent Document

Patent Document 1: Japanese Patent Application Laid-Open (kokai) No. 2015-159106

SUMMARY OF THE INVENTION

Problem to be Solved by the Invention

For example, for processing-related reasons, a first surface of an electrically conductive member that is located on its first side may include a flat portion and a protruding portion located closer to an edge of the first surface than the flat portion and protruding from the flat portion toward the first side in a first direction. When another electrically conductive member is stacked on the first surface of the electrically conductive member having the protruding portion, the protruding portion of the electrically conductive member interferes with the other electrically conductive member, and this may deteriorate the sealing between the two electrically conductive members.

The above problem also occurs when an electrolysis cell stack, which is a stack of solid oxide electrolysis cells (hereinafter referred to as "SOECs") that generate hydrogen using electrolysis of water, is produced. In the present specification, the fuel cell stack and the electrolysis cell stack are collectively referred to as an electrochemical reaction cell stack.

The present specification discloses a technique capable of solving the aforementioned problem.

Means for Solving the Problem

A technique disclosed in the present specification can be implemented in, for example, the following modes.

(1) An electrochemical reaction cell stack disclosed in the present specification comprises a plurality of unit cells each including an electrolyte layer and each further including a cathode and an anode that face each other in a first direction with the electrolyte layer therebetween, the plurality of unit cells being arranged in the first direction; and a plurality of flat plate-shaped electrically conductive members that are electrically conductive and arranged in the first direction, wherein the plurality of electrically conductive members comprise a first electrically conductive member having a first surface located on a first side in the first direction, the first surface including a first flat portion having a flat shape and a protruding portion that is located closer to an edge of the first surface than the first flat portion and protrudes from the first flat portion toward the first side in the first direction and a second electrically conductive member located on the first side of the first electrically conductive member in the first direction, the second electrically conductive member having a second surface facing the first surface of the first electrically conductive member, the second surface including a second flat portion having a flat shape and a recessed portion that faces the protruding portion of the first electrically conductive member and is recessed from the second flat portion toward the first side in the first direction, wherein the thickness of the second electrically conductive member in the first direction is larger than the thickness of the first electrically conductive member in the first direction, and the depth of the recessed portion from the second flat portion of the second electrically conductive member in the first direction is larger than the protruding length of the protruding portion from the first flat portion of the first electrically conductive member in the first direction. In the electrochemical reaction cell stack, the first electrically conductive member includes the protruding portion, and the second electrically conductive member includes the recessed portion located at a position facing the protruding portion. This can prevent the interference between the first electrically conductive member and the second electrically conductive member adjacent to each other. For the electrically conductive members, the larger the thickness in the first direction, the larger the amount of thermal expansion. Therefore, the thermally expanded recessed portion of an electrically conductive member with a large thickness is more likely to interfere with the protruding portion of another electrically conductive member. In the present electrochemical reaction cell stack, the thickness of the second electrically conductive member in the first direction is larger than the thickness of the first electrically conductive member in the first direction. Moreover, the depth of the recessed portion of the second electrically conductive member from the second flat portion in the first direction is larger than the protruding length of the protruding portion of the first electrically conductive member from the first flat portion in the first direction. Therefore, in the present electrochemical reaction cell stack, the interference between the first and second electrically conductive members adjacent to each other due to thermal expansion is less likely to occur than when the depth of the recessed portion is equal to or less than the protruding length of the protruding portion.

(2) In the above-described electrochemical reaction cell stack, the distance between the protruding portion of the first electrically conductive member and the recessed portion of the second electrically conductive member in the first direction increases toward the edge of the first surface. In the present electrochemical reaction cell stack, the interference between the first and second electrically conductive members adjacent to each other due to thermal expansion can be prevented more effectively than when the distance between the protruding portion and the recessed portion in the first direction is approximately uniform.

(3) In the above-described electrochemical reaction cell stack, the plurality of electrically conductive members further comprise: a third electrically conductive member having a third surface located on the first side in the first direction, the third surface including a third flat portion having a flat shape and a protruding portion that is located closer to an edge of the third surface than the third flat portion and protrudes from the third flat portion toward the first side in the first direction; and a fourth electrically conductive member located on the first side of the third electrically conductive member in the first direction, the fourth electrically conductive member having a fourth surface facing the third surface of the third electrically conductive member, the fourth surface including a fourth flat portion having a flat shape and a recessed portion that faces the protruding portion of the third electrically conductive member and is recessed from the fourth flat portion toward the first side in the first direction, and wherein the thickness of the second electrically conductive member in the first direction differs from the thickness of the fourth electrically conductive member in the first direction, and the depth of the recessed portion of a thicker one of the second electrically conductive member and the fourth electrically conductive member in the first direction is larger than the depth of the recessed portion of the other in the first direction. For the electrically conductive members, the larger the thickness in the first direction, the larger the amount of thermal expansion. Therefore, the thermally expanded recessed portion of an electrically conductive member with a large thickness is more likely to interfere with the protruding portion of another electrically conductive member. The deeper the recessed portion, the better. However, if the recessed portion of a relatively thin electrically conductive member is excessively deep, the strength of the electrically conductive member may be less than a prescribed level. However, in the present electrochemical reaction cell stack, the depth in the first direction of the recessed portion of a thicker one of the second electrically conductive member and the fourth electrically conductive member is larger than the depth of the recessed portion of the other in the first direction. Therefore, while a reduction in strength of the electrically conductive members is prevented, the interference between adjacent electrically conductive members can be prevented.

(4) In the above-described electrochemical reaction cell stack, the ratio of the depth of the recessed portion in the first direction to the thickness of the second electrically conductive member in the first direction is 7% or more. In the present electrochemical reaction cell stack, the physical interference between adjacent electrically conductive members is less likely to occur than when the ratio of the depth of the recessed portion in the first direction to the thickness of the second electrically conductive member in the first direction is less than 7%.

(5) In the above-described electrochemical reaction cell stack, the ratio of the protruding length of the protruding portion in the first direction to the thickness of the first electrically conductive member in the first direction is 2% or less. In the present electrochemical reaction cell stack, corrosion of the protruding portion due to oxidation etc. is less likely to occur than when the ratio of the protruding length of the protruding portion in the first direction to the thickness of the first electrically conductive member in the first direction is more than 2%.

(6) In the above-described electrochemical reaction cell stack, a gas passage extending in the first direction is formed in the first electrically conductive member, and wherein the edge of the first surface faces the gas passage. In the present electrochemical reaction cell stack, in the vicinity of the gas passage, the interference between adjacent electrically conductive members can be prevented, while a reduction in strength of the first electrically conductive member is prevented.

(7) In the above-described electrochemical reaction cell stack, the electrolyte layer contains a solid oxide.

(8) An interconnector-electrochemical reaction unit cell composite body disclosed in the present specification comprises: a unit cell including an electrolyte layer and further including a cathode and an anode that face each other in a first direction with the electrolyte layer therebetween; and a plurality of flat plate-shaped electrically conductive members that are electrically conductive and arranged in the first direction, wherein the plurality of electrically conductive members comprise a separator having a through hole formed therein, the separator having a portion surrounding the through hole, the portion being joined to a peripheral edge of the unit cell, the separator separating a cathode chamber to which the cathode is exposed from an anode chamber to which the anode is exposed, an interconnector disposed on one side of the unit cell where the cathode or the anode is present, and a frame member disposed between the separator and the interconnector, wherein a first surface of the separator that is located on a frame member side includes a first flat portion having a flat shape and a protruding portion that is located closer to an edge of the first surface than the first flat portion and protrudes from the first flat portion toward the frame member side, wherein a second surface of the frame member that is located on a separator side includes a second flat portion having a flat shape and a recessed portion that faces the protruding portion of the separator and is recessed from the second flat portion toward a side opposite to the separator, and wherein the thickness of the frame member in the first direction is larger than the thickness of the separator in the first direction, and the depth of the recessed portion of the frame member from the second flat portion in the first direction is larger than the protruding length of the protruding portion of the separator from the first flat portion in the first direction. In the present interconnector-electrochemical reaction unit cell composite body, the interference between the separator and the frame member adjacent to each other due to thermal expansion is less likely to occur than when the depth of the recessed portion is equal to or less than the protruding length of the protruding portion.

(9) In the above-described interconnector-electrochemical reaction unit cell composite body, the electrolyte layer contains a solid oxide.

(10) An electrochemical reaction cell stack manufacturing method disclosed in the present specification is a method for manufacturing an electrochemical reaction cell stack including a plurality of unit cells arranged in a first direction and a plurality of flat plate-shaped electrically conductive members having electric conductivity and arranged in the first direction, each of the plurality of unit cells including an electrolyte layer and further including a cathode and an anode that face each other in the first direction with the electrolyte layer therebetween, the method comprising: a preparation step of preparing the plurality of electrically conductive members by press working, each of the electrically conductive members having a first surface located on a first side in the first direction and a second surface located on a second side in the first direction, the first surface including a first flat portion having a flat shape and a protruding portion that is located closer to an edge of the first surface than the first flat portion and protrudes from the first flat portion toward the first side in the first direction, the second surface including a second flat portion having a flat shape and a recessed portion recessed from the second flat portion toward the first side in the first direction; a working step of subjecting the protruding portion of each of the electrically conductive members to working such that the protruding length of the protruding portion from the first flat portion in the first direction is reduced; and an arrangement step of arranging the plurality of electrically conductive members in the first direction such that the protruding portion of the first surface of one of two adjacent electrically conductive members of the plurality of electrically conductive members faces the recessed portion of the second surface of the other one of the two adjacent electrically conductive members. With the present electrochemical reaction cell stack production method, an electrochemical reaction cell stack can be produced, in which the interference between adjacent electrically conductive members can be prevented while a reduction in strength of the electrically conductive members is prevented.

The technique disclosed in the present specification can be implemented in various modes such as an electrochemical reaction cell stack (a fuel cell stack or an electrolysis cell stack) including a plurality of electrochemical reaction unit cells, an interconnector-electrochemical reaction unit cell composite body, electrochemical reaction units, and their production methods.

MODES FOR CARRYING OUT THE INVENTION

A. Embodiment

A-1. Structure (Structure of Fuel Cell Stack 100)

Figure 1:
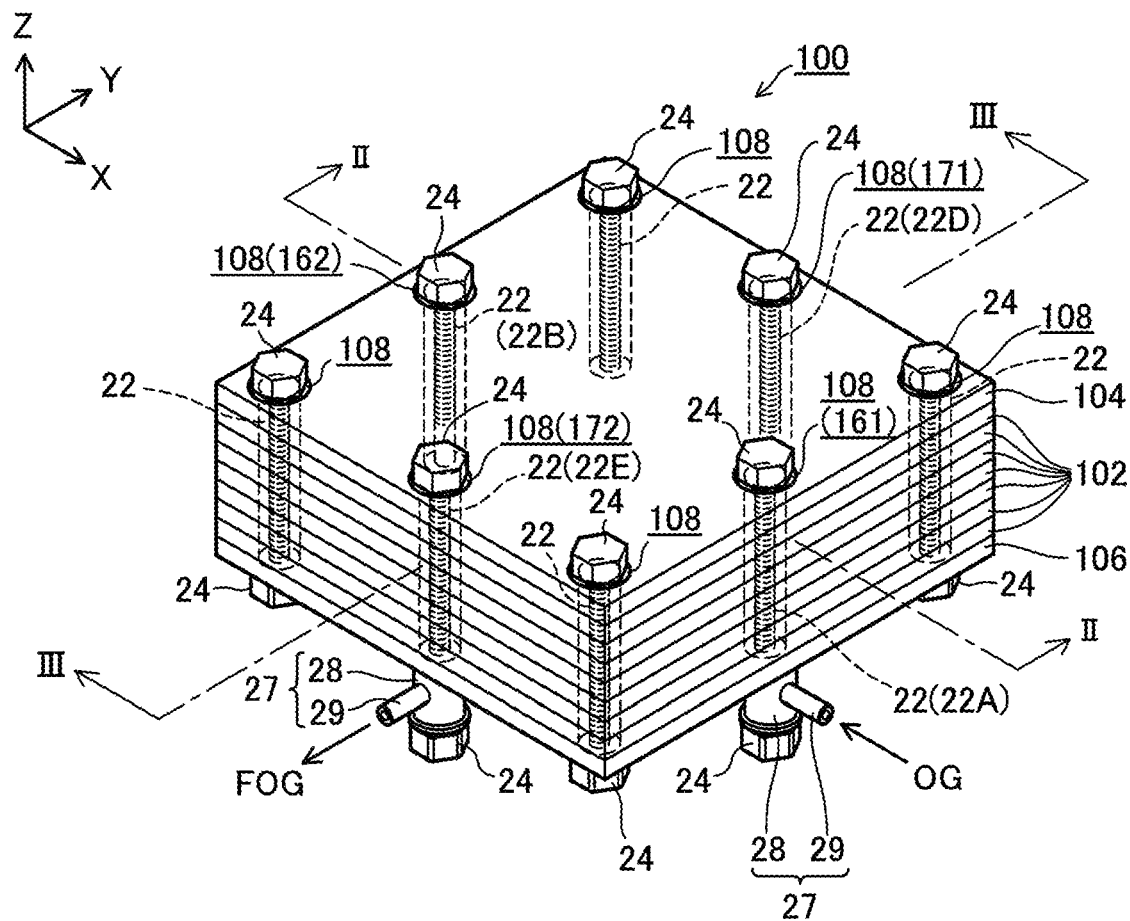
FIG. 1 Perspective view showing the external appearance of a fuel cell stack 100 according to an embodiment.
Figure 2:
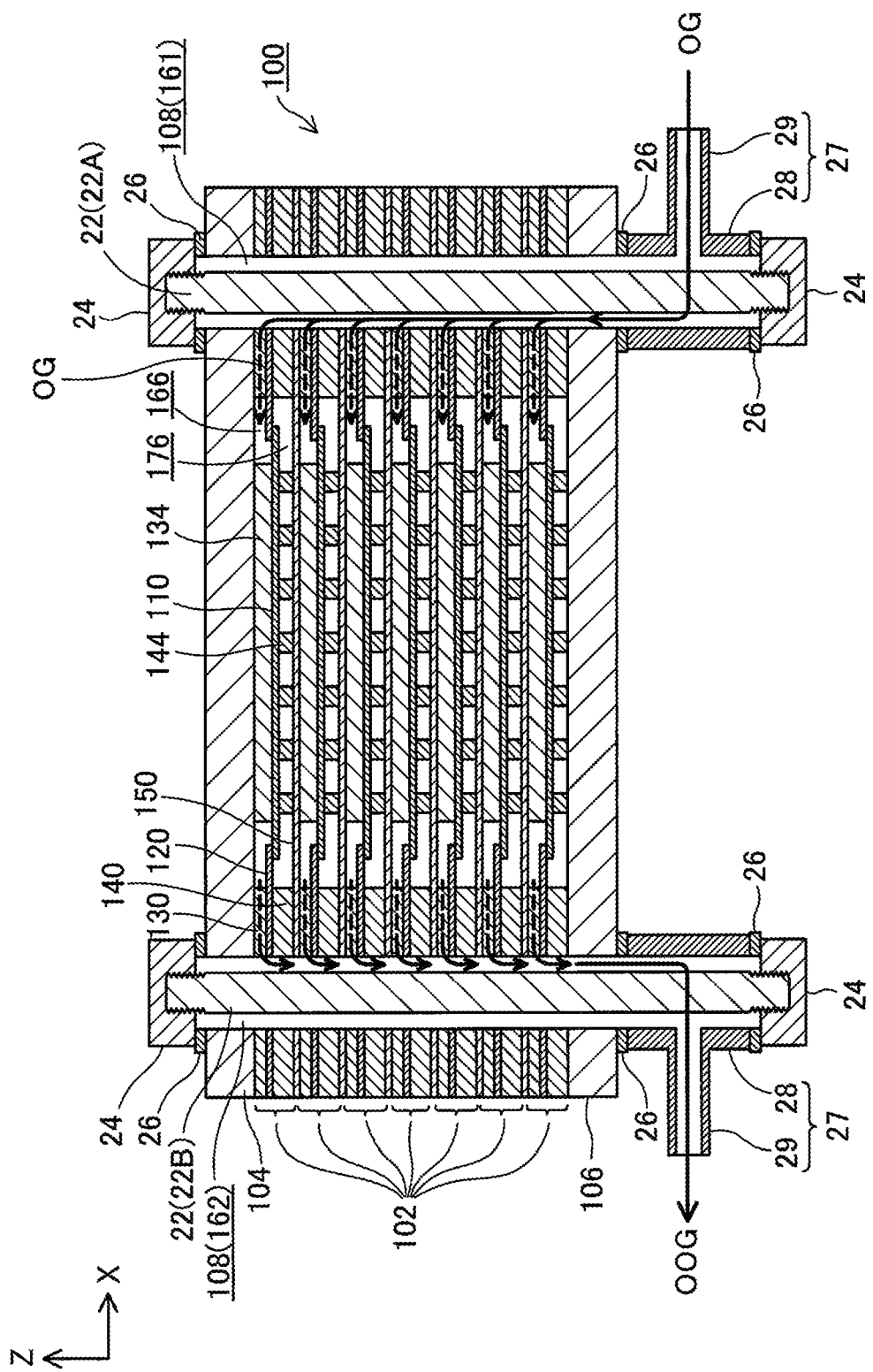
FIG. 2 Explanatory view showing an XZ section of the fuel cell stack 100 taken along line II-II of FIG. 1.
Figure 3:
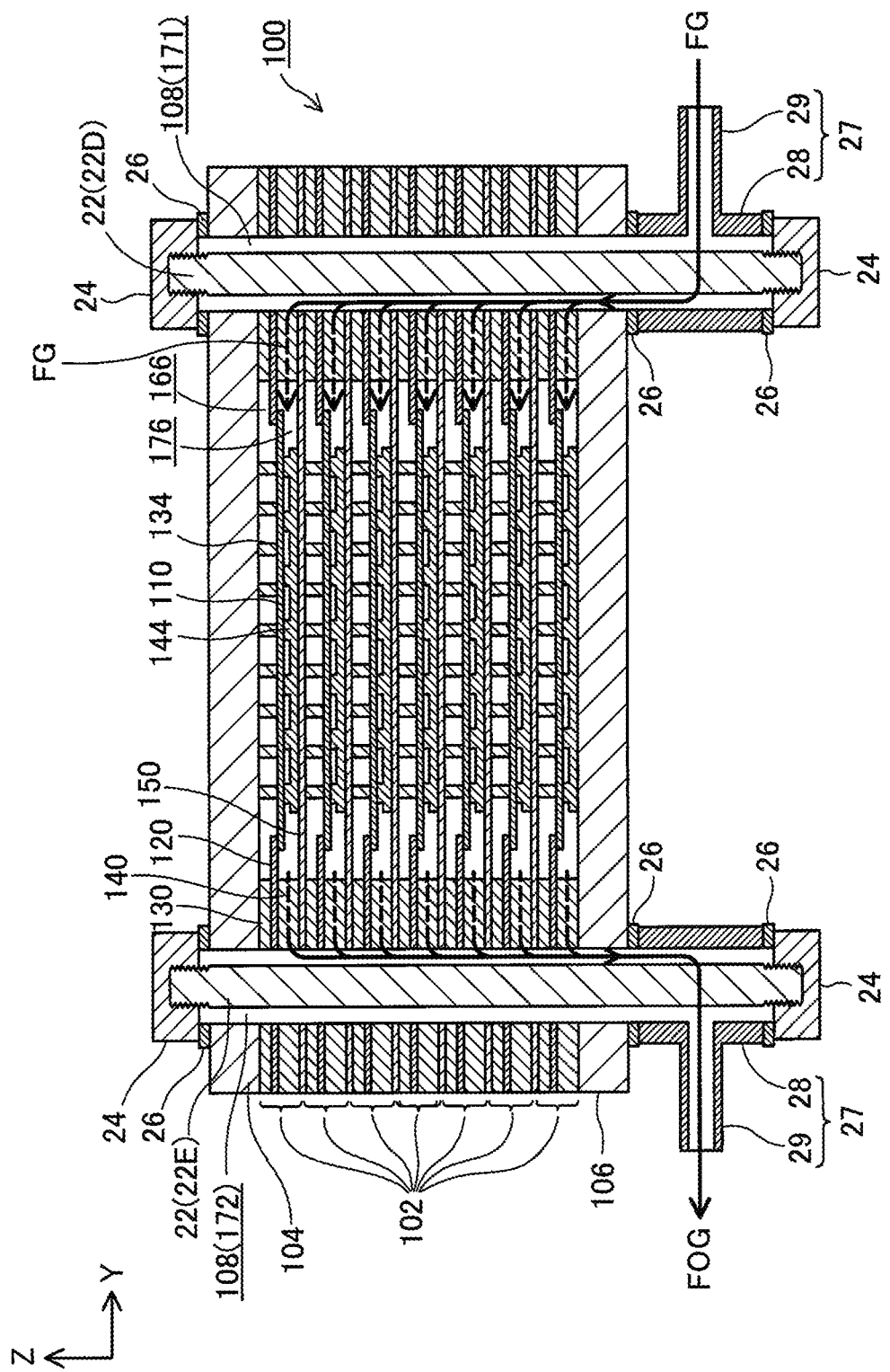
FIG. 3 Explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings.

The fuel cell stack 100 includes a plurality (seven in the present embodiment) of electricity generation units 102 and a pair of end plates 104 and 106. The seven electricity generation units 102 are disposed in a predetermined direction of array (in the vertical direction in the present embodiment). A pair of the end plates 104 and 106 is disposed in such a manner as to hold an assembly of the seven electricity generation units 102 from the upper and lower sides thereof. The direction of array (vertical direction) corresponds to the first direction appearing in the claims.

The fuel cell stack 100 has a plurality (eight in the present embodiment) of holes extending in the vertical direction through peripheral portions about the Z-axis direction of its component layers (the electricity generation units 102 and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100. The thickness (the vertical dimension (which may be the average dimension or the maximum dimension), the same applies to the following) of each of the end plates 104 and 106 is less than the thickness H3 of interconnectors 150.

(Structure of Electricity Generation Unit 102)

Figure 4:
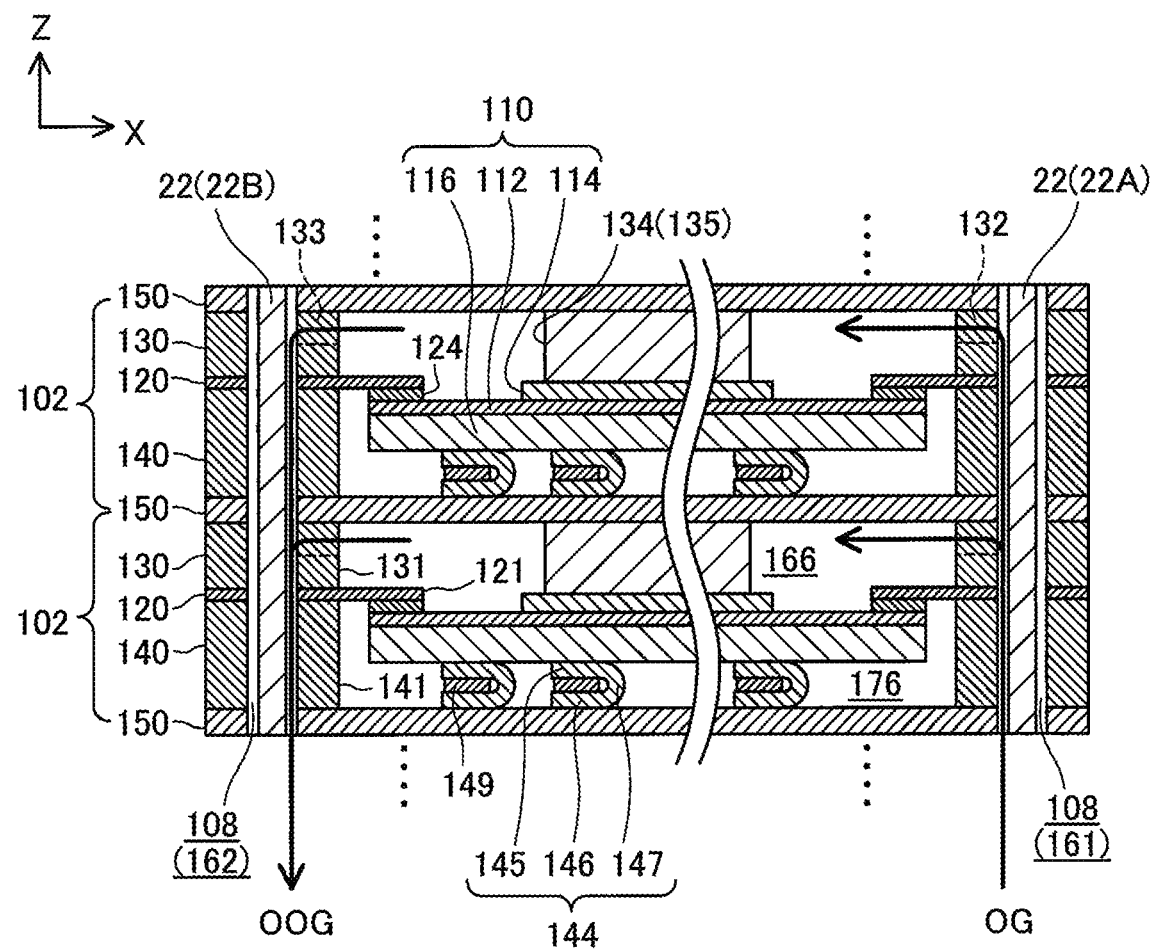
FIG. 4 Explanatory view showing an XZ section of two adjacent electricity generation units 102 at the same position as that of FIG. 2.
Figure 5:
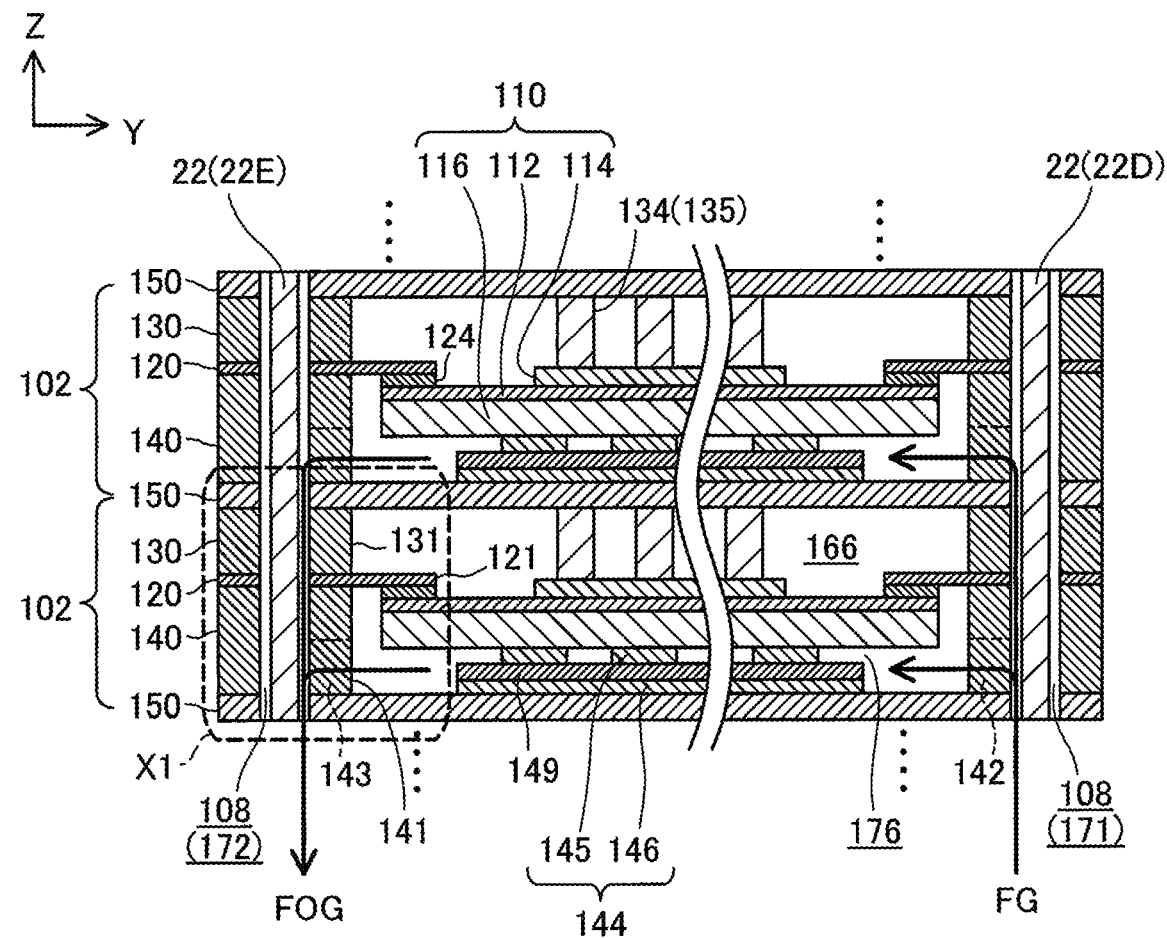
FIG. 5 Explanatory view showing a YZ section of two adjacent electricity generation units 102 at the same position as that of FIG. 3.

FIG. 4 is an explanatory view showing an XZ section of two adjacent electricity generation units 102 at the same position as that of FIG. 2, and FIG. 5 is an explanatory view showing a YZ section of two adjacent electricity generation units 102 at the same position as that of FIG. 3.

As shown in FIGS. 4 and 5, the electricity generation unit 102 includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3). The thickness H3 of the interconnectors 150 is smaller than the thickness H2 of the anode-side frame 140 described later and is, for example, about 0.8 (mm).

The unit cell 110 includes an electrolyte layer 112, a cathode 114 and an anode 116 that face each other in the vertical direction (in the direction of array of the electricity generation units 102) with the electrolyte layer 112 intervening therebetween. In the present embodiment, the thickness (the vertical size) of the anode 116 is larger than the thicknesses of the cathode 114 and the electrolyte layer 112, and the anode 116 supports other layers included in the unit cell 110. Specifically, the unit cell 110 in the present embodiment is an anode-support-type unit cell.

The electrolyte layer 112 is an approximately rectangular flat plate-shaped member, contains at least Zr, and is formed of a solid oxide such as YSZ (yttria-stabilized zirconia), ScSZ (scandia-stabilized zirconia), or CaSZ (calcia-stabilized zirconia). The cathode 114 is an approximately rectangular flat plate-shaped member and is formed of, for example, a perovskite oxide (such as LSCF (lanthanum strontium cobalt ferrite), LSM (lanthanum strontium manganese oxide), or LNF (lanthanum nickel ferrite)). The anode 116 is an approximately rectangular flat plate-shaped member and is formed of, for example, Ni (nickel), a cermet of Ni and ceramic particles, or an Ni-based alloy. As described above, the unit cell 110 (electricity generation unit 102) according to the present embodiment is a solid oxide fuel cell (SOFC) that uses a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (unit cell 110) by means of a bonding layer 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the unit cell 110. The thickness H1 of the separator 120 is smaller than the thickness H3 of the interconnectors 150 and is, for example, about 0.1 (mm). The hole 121 corresponds to the through hole in the claims.

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162. The thickness of the cathode-side frame 130 is larger than the thickness H1 of the separator 120 and the thickness H3 of the interconnectors 150 and is, for example, about 1.0 (mm).

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172. The thickness H2 of the anode-side frame 140 is larger than the thickness H1 of the separator 120 and the thickness H3 of the interconnectors 150 and is, for example, about 1.5 (mm).

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. The cathode-side current collector 134 and the interconnector 150 may be integrally formed as a unitary member. The cathode-side current collector 134 may be coated with an electrically conductive coating, and an electrically conductive bonding layer for bonding the cathode 114 and the cathode-side current collector 134 may be disposed therebetween. The separator 120, the interconnectors 150, the anode-side frame 140, and the end plates 104 and 106 correspond to the plurality of electrically conductive members in the claims. A composite body composed of the unit cell 110, the separator 120, the interconnector 150, and the anode-side frame 140 corresponds to the interconnector-electrochemical reaction unit cell composite body in the claims and is referred to also as a cassette.

A-2. Operation of Fuel Cell Stack 100

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

A-3. Detailed Structure of Electricity Generation Units 102

Figure 6:
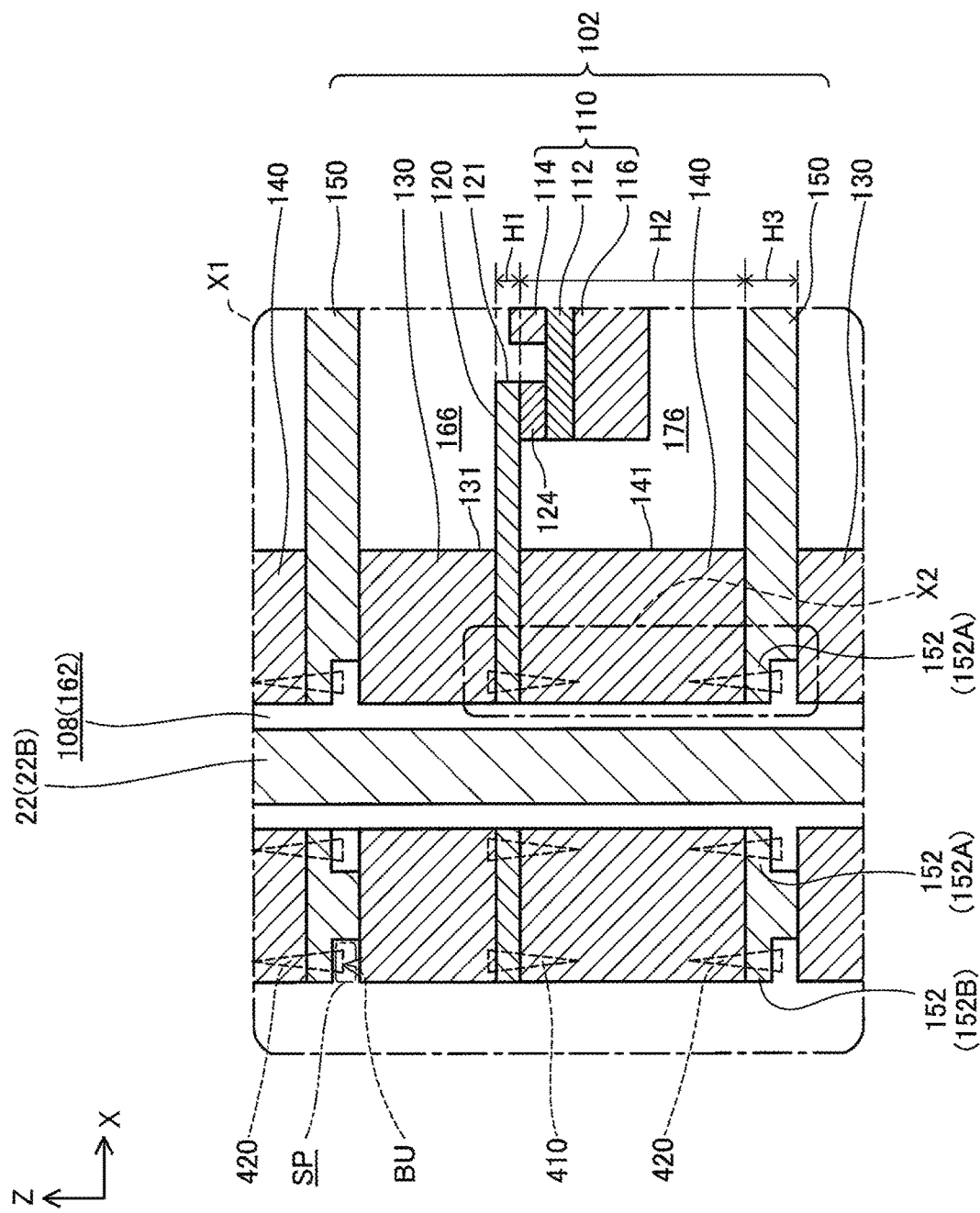
FIG. 6 Explanatory view showing a detailed structure of an electricity generation unit 102 (the structure of portion X1 in FIG. 5).
Figure 7:
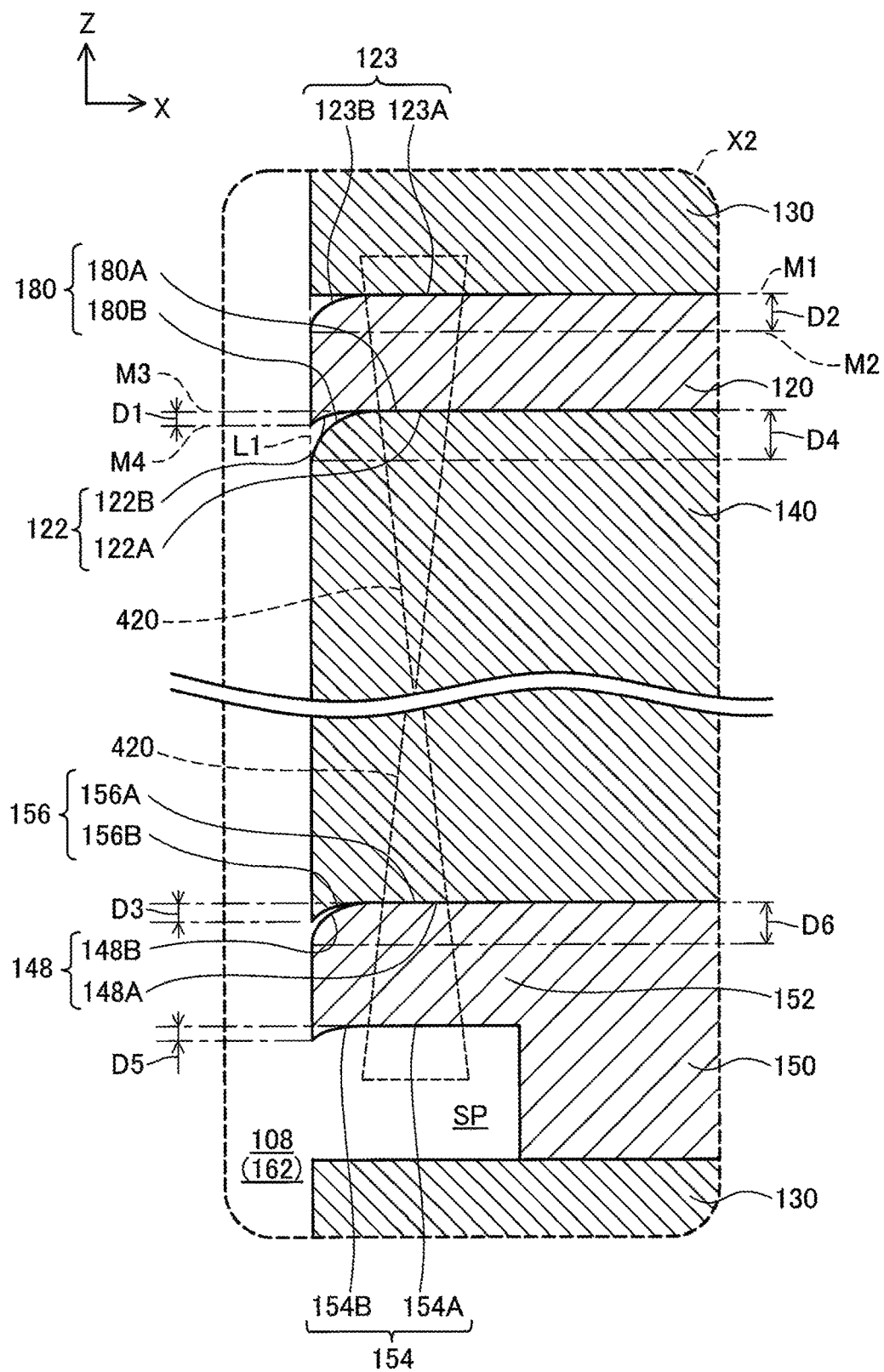
FIG. 7 Explanatory view showing a detailed structure of the electricity generation unit 102 (the structure of portion X2 in FIG. 6).
Figure 8:
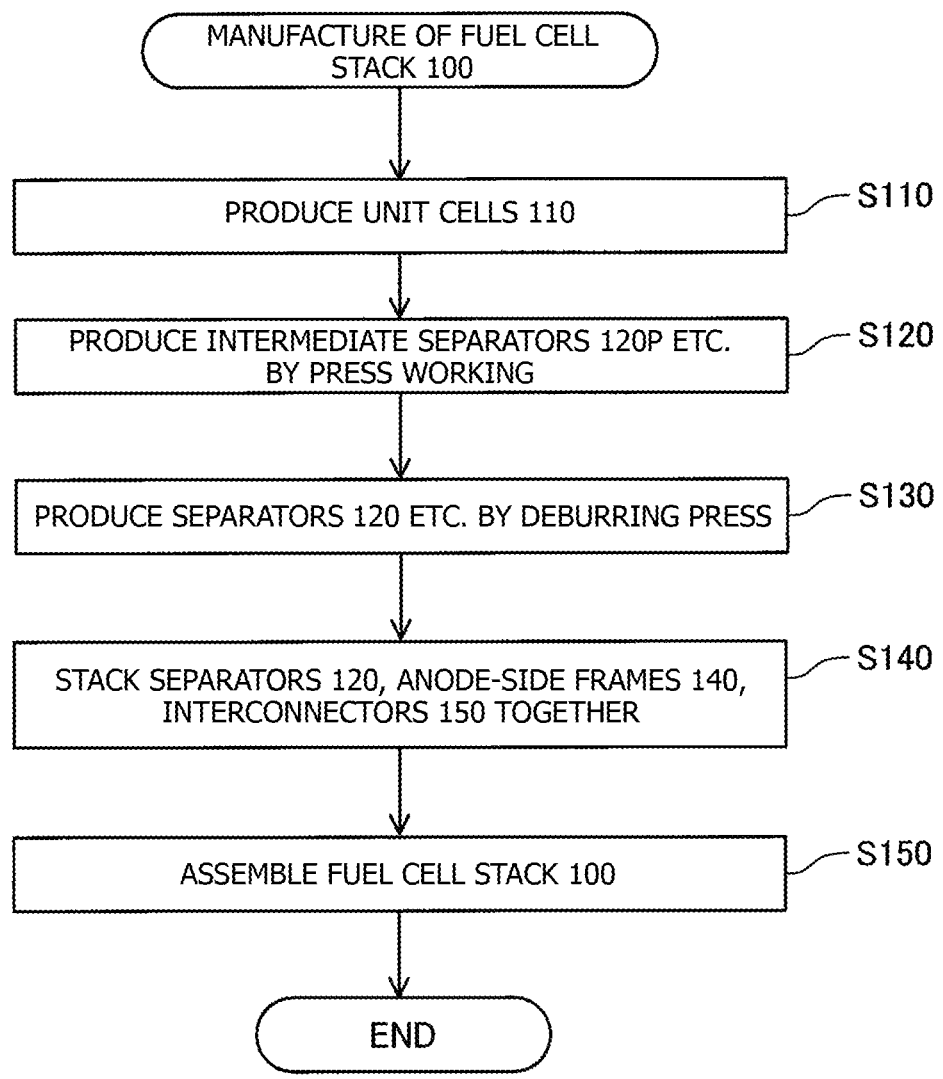
FIG. 8 Flowchart showing an example of a method for manufacturing the fuel cell stack 100 in the embodiment.

FIGS. 6 to 8 are illustrations showing the detailed structure of an electricity generation unit 102. FIG. 6 is an enlarged illustration of the structure of portion X1 in FIG. 5, and FIG. 7 is an enlarged illustration of the structure of portion X2 in FIG. 6. FIG. 8 is an enlarged illustration of the structure of portion X3 in FIG. 6. As described above, the separator 120, the anode-side frame 140, and the interconnectors 150 are flat plate-shaped electrically conductive members and are arranged in the vertical direction (the Z direction).

(Separator 120)

As shown in FIGS. 6 and 7, a surface of the separator 120 that is on the side toward the anode-side frame 140 (this surface is hereinafter referred to as a "separator lower surface 122") includes a separator lower flat portion 122A and separator protruding portions 122B. The separator lower flat portion 122A is a flat portion approximately parallel to plane directions orthogonal to the vertical direction. Each separator protruding portion 122B is located closer to an edge of the separator lower surface 122 than the separator lower flat portion 122A and protrudes from the separator lower flat portion 122A toward the anode-side frame 140. Specifically, edges of the separator lower surface 122 include edges around the openings of communication holes 108 formed on the separator lower surface 122 and the peripheral edges of the separator lower surface 122 that define its outer shape. The separator protruding portions 122B are inclined surfaces whose positions shift toward the anode-side frame 140 (downward) as approaching the respective edges of the separator lower surface 122. FIG. 7 shows, on an enlarged scale, a portion around the opening edge of a communication hole 108 formed on the separator lower surface 122. The separator 120 corresponds to the first electrically conductive member in the claims. The separator lower surface 122 corresponds to the first surface in the claims, and the separator lower flat portion 122A corresponds to the first flat portion in the claims. Each separator protruding portion 122B corresponds to the protruding portion in the claims.

A surface of the separator 120 that is on the side toward the cathode-side frame 130 (this surface is hereinafter referred to as a "separator upper surface 123") includes a separator upper flat portion 123A and separator recessed portions 123B. The separator upper flat portion 123A is a flat portion approximately parallel to plane directions orthogonal to the vertical direction. Each separator recessed portion 123B is a portion located closer to an edge of the separator upper surface 123 than the separator upper flat portion 123A and is recessed from the separator upper flat portion 123A toward the side opposite to the cathode-side frame 130 (the side toward the anode-side frame 140). Specifically, edges of the separator upper surface 123 include edges around the openings of communication holes 108 formed on the separator upper surface 123 and the peripheral edges of the separator upper surface 123 that define its outer shape. The separator recessed portions 123B are inclined surfaces whose positions shift toward the anode-side frame 140 as approaching the respective edges of the separator upper surface 123. FIG. 7 shows, on an enlarged scale, a portion around the opening edge of a communication hole 108 formed on the separator upper surface 123.

(Anode-Side Frame 140)

As shown in FIGS. 6 and 8, a surface of the anode-side frame 140 that is on the side toward one of the interconnectors 150 (this surface is hereinafter referred to as a "frame lower surface 148") includes a frame lower flat portion 148A and frame protruding portions 148B. The frame lower flat portion 148A is a flat portion approximately parallel to plane directions orthogonal to the vertical direction. Each frame protruding portions 148B is a portion located closer to an edge of the frame lower surface 148 than the frame lower flat portion 148A and protrudes from the frame lower flat portion 148A toward the interconnector 150. Specifically, edges of the frame lower surface 148 include edges around the openings of communication holes 108 formed on the frame lower surface 148 and the peripheral edges of the frame lower surface 148 that define its outer shape. The frame protruding portions 148B are inclined surfaces whose positions shift toward the interconnector 150 (downward) as approaching the respective edges of the frame lower surface 148. FIG. 8 shows, on an enlarged scale, a portion around the opening edge of a communication hole 108 formed on the frame lower surface 148. The anode-side frame 140 corresponds to the third electrically conductive member and to the frame member in the claims, and the frame lower surface 148 corresponds to the third surface in the claims. The frame lower flat portion 148A corresponds to the third flat portion in the claims, and each frame protruding portion 148B corresponds to the protruding portion in the claims.

As shown in FIGS. 6 and 7, a surface of the anode-side frame 140 that is on the side toward the separator 120 (this surface is hereinafter referred to as a "frame upper surface 180") includes a frame upper flat portion 180A and frame recessed portions 180B. The frame upper flat portion 180A is a flat portion approximately parallel to plane directions orthogonal to the vertical direction. Each frame recessed portion 180B is a portion located closer to an edge of the frame upper surface 180 than the frame upper flat portion 180A and is recessed from the frame upper flat portion 180A toward the side opposite to the separator 120 (the side toward the interconnector 150). Specifically, edges of the frame upper surface 180 include edges around the openings of communication holes 108 formed on the frame upper surface 180 and the peripheral edges of the frame upper surface 180 that define its outer shape. The frame recessed portions 180B are inclined surfaces whose positions shift toward the interconnector 150 (downward) as approaching the respective edges of the frame upper surface 180. FIG. 7 shows, on an enlarged scale, a portion around the opening edge of a communication hole 108 formed on the frame upper surface 180. The anode-side frame 140 corresponds to the second electrically conductive member and to the frame member in the claims. The frame upper surface 180 corresponds to the second surface in the claims, and the frame upper flat portion 180A corresponds to the second flat portion in the claims. Each of the frame recessed portions 180B corresponds to the recessed portion in the claims.

(Interconnectors 150)

As shown in FIGS. 6 and 8, each of the interconnectors 150 has thin plate portions 152. Each thin plate portion 152 is formed by grooving the surface of the interconnector 150 that faces the cathode-side frame 130 such that the grooved portions have a smaller vertical thickness than other portions of the interconnector 150. As viewed in the vertical direction, the thin plate portions 152 include annular portions 152A surrounding the respective communication holes 108 and peripheral edge portions 152B extending along the outer edges of the anode-side frame 140 (the interconnector 150 and the separator 120) (see FIG. 6). A surface of the interconnector 150 that is located on the side toward the cathode-side frame 130 (this surface is hereinafter referred to as an "interconnector lower surface 154") includes an interconnector lower flat portion 154A and interconnector protruding portions 154B (see FIG. 8). The interconnector lower flat portion 154A is a flat portion approximately parallel to plane directions orthogonal to the vertical direction. Each interconnector protruding portion 154B is a portion located closer to an edge of the interconnector lower surface 154 than the interconnector lower flat portion 154A and protruding from the interconnector lower flat portion 154A toward the cathode-side frame 130. Specifically, edges of the interconnector lower surface 154 include edges around the openings of communication holes 108 formed on the interconnector lower surface 154 and the peripheral edges of the interconnector lower surface 154 that define its outer shape. The interconnector protruding portions 154B are inclined surfaces whose positions shift toward the cathode-side frame 130 (downward) as approaching the respective edges of the interconnector lower surface 154. FIG. 8 shows, on an enlarged scale, a portion around the opening edge of a communication hole 108 formed on the interconnector lower surface 154.

A surface of the interconnector 150 that is located on the side toward the anode-side frame 140 (this surface is hereinafter referred to as an "interconnector upper surface 156") includes an interconnector upper flat portion 156A and interconnector recessed portions 156B. The interconnector upper flat portion 156A is a flat portion approximately parallel to plane directions orthogonal to the vertical direction. Each interconnector recessed portion 156B is a portion located closer to an edge of the interconnector upper surface 156 than the interconnector upper flat portion 156A and recessed from the interconnector upper flat portion 156A toward the side opposite to the anode-side frame 140 (the side toward the cathode-side frame 130). Specifically, edges of the interconnector upper surface 156 include edges around the openings of communication holes 108 formed on the interconnector upper surface 156 and the peripheral edges of the interconnector upper surface 156 that define its outer shape. The interconnector recessed portions 156B are inclined surfaces whose positions shift toward the cathode-side frame 130 (downward) as approaching the respective edges of the interconnector upper surface 156. FIG. 8 shows, on an enlarged scale, a portion around the opening edge of a communication hole 108 formed on the interconnector upper surface 156. The interconnector 150 corresponds to the fourth electrically conductive member in the claims. The interconnector upper surface 156 corresponds to the fourth surface in the claims, and the interconnector upper flat portion 156A corresponds to the fourth flat portion in the claims. Each of the interconnector recessed portions 156B corresponds to the recessed portion in the claims.

In each of the electricity generation units 102 in the present embodiment, the anode-side frame 140 is welded to the separator 120 and to the lower interconnector of the pair of interconnectors 150 (the interconnector 150 on the anode 116 side). Specifically, in each electricity generation unit 102, first welded portions 410 for providing sealing between the anode-side frame 140 and the separator 120 and second welded portions 420 for providing sealing between the anode-side frame 140 and the interconnector 150 are formed. The first welded portions 410 and the second welded portions 420 are formed in portions that overlap the thin plate portions 152 (the annular portions 152A and the peripheral edge portions 152B) when viewed in the vertical direction. The first and second welded portions 410 and 420 are formed, for example, by laser welding. When the first and second welded portions 410 and 420 are formed, protrusions BU such as beads may be formed, so the flatness of the welded surfaces may deteriorate. However, the thin plate portions 152 of the interconnector 150 provide spaces SP between the interconnector 150 and the cathode-side frame 130. This can prevent the interference between protrusions BU and the cathode-side frame 130, so a reduction in the gas sealing provided by the cathode-side frame 130 can be prevented.

(Relation Between Separator 120, Anode-Side Frame 140, and Interconnectors 150)

For the separator 120, the anode-side frame 140, and each of the interconnectors 150, the larger the thickness (the dimension in the vertical direction), the larger the depth of the recessed portions (the dimension in the vertical direction, the same applies to the following). Specifically, as shown in FIG. 6, the dimensional relation between the thickness H1 of the separator 120, the thickness H2 of the anode-side frame 140, and the thickness H3 of the interconnector 150 is represented by the following relational formula 1.

$$H1 < H3 < H2 \quad \text{Relational formula 1:}$$

The dimensional relation between the depth D2 of the separator recessed portions 123B of the separator 120, the depth D4 of the frame recessed portions 180B of the anode-side frame 140, and the depth D6 of the interconnector recessed portions 156B of the interconnector 150 is represented by the following relational formula 2.

$$D2 < D6 < D4 \quad \text{Relational formula 2:}$$

For example, the depth D2 of the separator recessed portions 123B can be determined as follows. As shown in FIG. 7, in a cross section (ZX cross section) parallel to the Z direction, a straight line passing through an edge of the separator upper surface 123 and extending in the vertical direction (in FIG. 8, a straight line extending along an inner wall surface of a communication hole 108) is defined as a virtual straight line L1. A flat plane including the separator upper flat portion 123A and parallel to plane directions orthogonal to the vertical direction is defined as a first virtual plane M1. A plane including the intersection of the separator upper surface 123 (a separator recessed portion 123B) and the virtual straight line L1 (a point at which the inclination angle of the separator upper surface 123 coincides with the inclination angle of the virtual straight line L1) and parallel to the plane directions is defined as a second virtual plane M2. The depth D2 of the separator recessed portion 123B is the vertical separation distance between the first virtual plane M1 and the second virtual plane M2. The depth D4 of the frame recessed portions 180B and the depth D6 of the interconnector recessed portions 156B can be determined in the same manner.

Next, in the separator 120, the vertical protruding length D1 of the separator protruding portions 122B is smaller than the depth D2 of the separator recessed portions 123B. In the anode-side frame 140, the vertical protruding length D3 of the frame protruding portions 148B is smaller than the depth D4 of the frame recessed portions 180B. Specifically, the protruding length D3 of the frame protruding portions 148B is smaller than a length corresponding to the depth D4 of the frame recessed portions 180B. In the interconnectors 150, the vertical protruding length D5 of the interconnector protruding portions 154B is smaller than the depth D6 of the interconnector recessed portions 156B. Specifically, the protruding length D5 of the interconnector protruding portions 154B is smaller than a length corresponding to the depth D6 of the interconnector recessed portions 156B.

For example, the vertical protruding length D1 of the separator protruding portions 122B can be determined as follows. As shown in FIG. 7, a plane including the separator lower flat portion 122A and parallel to plane directions orthogonal to the vertical direction is defined as a third virtual plane M3. A plane including the vertexes (lowest portions) of the separator protruding portions 122B and parallel to the plane directions is defined as a fourth virtual plane M4. The vertical protruding length D1 of the separator protruding portions 122B is the vertical separation distance between the third virtual plane M3 and the fourth virtual plane M4. The vertical protruding length D3 of the frame protruding portions 148B and the vertical protruding length D5 of the interconnector protruding portions 154B can be determined in the same manner. The depth D2 of the separator recessed portions 123B in the separator 120 is preferably 0.02 (mm) or more and is preferably less than 0.08 (mm). The depth D6 of the interconnector recessed portions 156B in the interconnectors 150 is preferably 0.08 (mm) or more and is preferably less than 0.1 (mm). Similarly, the depth D4 of the frame recessed portions 180B in the anode-side frame 140 is preferably 0.1 (mm) or more.

In the separator 120, the ratio of the depth D2 of the separator recessed portions 123B to the thickness H1 of the separator 120 (=(D2/H1)×100) is preferably 20% or more. Similarly, in the anode-side frame 140, the ratio of the depth D4 of the frame recessed portions 180B to the thickness H2 of the anode-side frame 140 (=(D4/H2)×100) is preferably 7% or more. In the interconnectors 150, the ratio of the depth D6 of the interconnector recessed portions 156B to the thickness H3 of the interconnectors 150 (=(D6/H3)×100) is preferably 0.4% or more.

In the separator 120, the ratio of the vertical protruding length D1 of the separator protruding portions 122B to the thickness H1 of the separator 120 (=(D1/H1)×100) is preferably 2% or less. Similarly, in the anode-side frame 140, the ratio of the vertical protruding length D3 of the frame protruding portions 148B to the thickness H2 of the anode-side frame 140 (=(D3/H2)×100) is preferably 0.4% or less. In the interconnectors 150, the ratio of the vertical protruding length D5 of the interconnector protruding portions 154B to the thickness H3 of the interconnectors 150 (=(D5/H3)×100) is preferably 0.4% or less.

A-4. Method for Manufacturing Fuel Cell Stack 100

Figure 9:
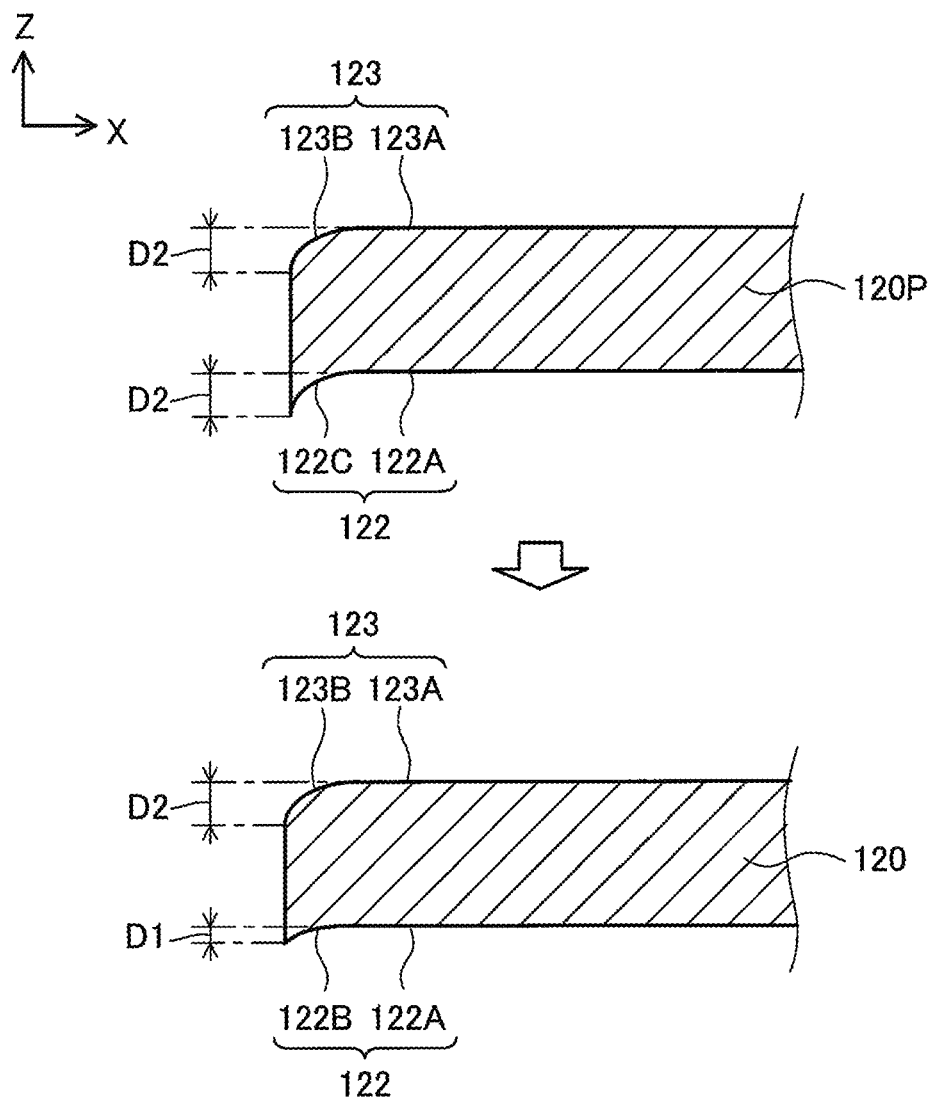
FIG. 9 Explanatory view showing a working step for a separator 120.

FIG. 8 is a flowchart showing an example of a method for manufacturing the fuel cell stack 100 in the present embodiment, and FIG. 9 is an illustration showing a working step for the separator 120. First, unit cells 110 are produced by a known method (S110). For example, an anode green sheet and an electrolyte layer green sheet are laminated and degreased at a prescribed temperature (e.g., about 280° C.). Then the degreased green sheet stack is fired at a prescribed temperature (e.g., about 1,350° C.). The stack of the electrolyte layer 112 and the anode 116 is thereby obtained. Next, a solution mixture of materials forming the cathode is sprayed onto the surface of the electrolyte layer 112 in the stack of the electrolyte layer 112 and the anode 116, and the resulting stack is fired at a prescribed temperature (e.g., 1,100° C.). The cathode 114 is thereby formed on the surface of the electrolyte layer 112, and a unit cell 110 including the anode 116, the electrolyte layer 112, and the cathode 114 is thereby obtained.

Next, separators 120, anode-side frames 140, and interconnectors 150 having the structures described above are produced (S120 to S130). The production of a separator 120 will be described as an example. First, a metal plate formed of the material for forming the separator 120 is stamped by press working to form an intermediate separator 120P with the hole 121 and communication holes 108 formed therein (S120). As shown in the upper part of FIG. 9, as a result of the press working, burrs protruding in the stamping direction (the downward direction) are formed at edges of the intermediate separator 120P. When the burrs are formed, intermediate separator protruding portions 122C are formed on the separator lower surface 122 of the intermediate separator 120P, and the separator recessed portions 123B are formed on the separator upper surface 123. The vertical protruding length of the intermediate separator protruding portions 122C is approximately the same as the depth D2 of the separator recessed portions 123B. The step S120 corresponds to the preparation step in the claims. The separators 120, the anode-side frames 140, and the interconnectors 150 having the above-described structures may be purchased from outside suppliers.

Next, the intermediate separator protruding portions 122C are subjected to deburring press, so that the intermediate separator protruding portions 122C become the separator protruding portions 122B. The separator 120 shown in the lower part of FIG. 9 can thereby be produced. The step S130 corresponds to the working step in the claims.

Next, a plurality of electrically conductive members are vertically arranged such that the protruding portions of one of two adjacent electrically conductive members face the recessed portions of the other one (S140). Specifically, a unit cell 110 is joined to a separator 120, and then the separator 120 and an anode-side frame 140 are stacked such that the separator protruding portions 122B of the separator 120 face the frame recessed portions 180B of the anode-side frame 140 in the vertical direction as shown in FIGS. 7 and 8. In this case, since the vertical protruding length D1 of the separator protruding portions 122B is smaller than the depth D4 of the frame recessed portions 180B, the interference between the separator protruding portions 122B and the anode-side frame 140 can be prevented. Then the anode-side frame 140 and an interconnector 150 are stacked such that the frame protruding portions 148B of the anode-side frame 140 face the interconnector recessed portions 156B of the interconnector 150 in the vertical direction. In this case, since the vertical protruding length D3 of the frame protruding portions 148B is smaller than the depth D6 of the interconnector recessed portions 156B, the interference between the frame protruding portions 148B and the interconnector 150 can be prevented. The step S140 corresponds to the arrangement step in the claims.

Then the fuel cell stack 100 is assembled (S150). Specifically, a plurality of structures (cassettes) each including the unit cell 110, the separator 120, the anode-side frame 140, and the interconnector 150 are stacked through cathode-side frames 130 and fastened by the bolts 22. The fuel cell stack 100 having the above-described structure can thereby be produced.

A-5. Effects of Present Embodiment

In the present embodiment, an upper second surface of each of the electrically conductive members (the separator 120, the anode-side frame 140, and the interconnectors 150) includes: a second flat portion having a flat shape and facing a flat portion (first flat portion) of another electrically conductive member located above the each electrically conductive member; and recessed portions that face protruding portions of the other electrically conductive member and are recessed upward from the second flat portion. For example, in the anode-side frame 140, the frame upper surface 180 includes the frame upper flat portion 180A and the frame recessed portions 180B, and the frame recessed portions 180B face the separator protruding portions 122B of the separator 120 (see FIG. 7). Therefore, the interference between adjacent electrically conductive members can be prevented.

For the electrically conductive members, the larger the vertical thickness, the larger the amount of thermal expansion. Therefore, the thermally expanded recessed portions of an electrically conductive member with a large thickness are more likely to interfere with the protruding portions of another electrically conductive member. In the present embodiment, the thickness H2 of the anode-side frame 140 is larger than the thickness H1 of the separator 120. Moreover, the depth D4 of the frame recessed portions 180B of the anode-side frame 140 is larger than the protruding length D1 of the separator protruding portions 122B of the separator 120. Specifically, the length corresponding to the depth D4 of the frame recessed portions 180B is larger than the protruding length D1 of the separator protruding portions 122B. Therefore, in the present embodiment, the interference between the separator 120 and the anode-side frame 140 adjacent to each other due to thermal expansion is less likely to occur than when the depth D4 of the frame recessed portions 180B is equal to or less than the protruding length D1 of the separator protruding portions 122B.

As shown in FIG. 7, the vertical distance between the separator protruding portions 122B and the frame recessed portions 180B increases toward the edges of the separator 120 and the anode-side frame 140. In the present embodiment, the interference between the separator 120 and the anode-side frame 140 adjacent to each other due to thermal expansion of the anode-side frame 140 can be prevented more effectively than when, for example, the vertical distance between the separator protruding portions 122B and the frame recessed portions 180B is approximately uniform.

The thicker an electrically conductive member, the larger the amount of its thermal expansion. Therefore, the thermally expanded recessed portion of an electrically conductive member with a large thickness is more likely to interfere with the protruding portions of another electrically conductive member. For example, when the temperature of the unit cells 110 increases due to heat generation by the power generation operation of the unit cells 110, the electrically conductive members undergo thermal expansion. However, since the expansion of the electrically conductive members in the vertical direction (the thickness direction) is restricted by tightening with the bolts 22, each electrically conductive member expands in plane directions orthogonal to the vertical direction of the fuel cell stack 100 accordingly. The amount of expansion in the plane directions increases as the thickness of the electrically conductive member increases. As the anode-side frame 140 and the separator 120 expand, the frame recessed portions 180B and the separator recessed portions 123B are displaced outward in the plane directions of the fuel cell stack 100. As described above, the thickness H2 of the anode-side frame 140 is larger than the thickness H1 of the separator 120. Therefore, the amount of outward displacement of the frame recessed portions 180B in the plane directions is larger than the amount of outward displacement of the separator recessed portions 123B in the plane directions. For this reason, the frame recessed portions 180B are more likely to interfere with the protruding portions of another electrically conductive member than the separator recessed portions 123B. The deeper the recessed portions, the better. However, if the recessed portion of a relatively thin electrically conductive member (e.g., the separator 120) is excessively deep, the strength of the electrically conductive member may be less than a prescribed level, and its intended function (the function of separating the cathode chamber 166 and the anode chamber 176 from each other) may not be obtained. However, for the separator 120, the anode-side frame 140, and the interconnectors 150 in the fuel cell stack 100 in the present embodiment, the larger the thickness, the deeper the recessed portions. Therefore, while a reduction in the strength, etc. of each electrically conductive member can be prevented, the interference between adjacent electrically conductive members can be prevented.

The larger the protruding length of the protruding portions, the more acute the angle of the ends of the protruding portions, and the more likely the ends of the protruding portions are to corrode because of local oxidation. For example, when the electricity generation units 102 and the fuel cell stack 100 are shipped, the electrically conductive members may be exposed to the outside air and oxidized. However, in each electrically conductive member in the present embodiment, the protruding length of the protruding portions from the first flat portion is smaller than the depth of the recessed portions from the second flat portion. For example, in the separator 120, the vertical protruding length D1 of the separator protruding portions 122B is smaller than the depth D2 of the separator recessed portions 123B. In this case, corrosion of the protruding portions caused by oxidation can be reduced more effectively than when the protruding length of the protruding portions from the first flat portion is equal to or larger than the depth of the recessed portions from the second flat portion.

In the present embodiment, the ratio of the depth of recessed portions of each electrically conductive member to its thickness is 7% or more. For example, in the separator 120, the ratio of the depth D2 of the separator recessed portions 123B to the thickness H1 of the separator 120 (=(D2/H1)×100) is 20% or more. In this case, the physical interference between adjacent electrically conductive members is less likely to occur than when the ratio of the depth of the recessed portions of the electrically conductive member to its thickness is less than 7%.

In the present embodiment, the ratio of the protruding length of the protruding portions of each electrically conductive member to its thickness is 2% or less. For example, in the separator 120, the ratio of the vertical protruding length D1 of the separator protruding portions 122B to the thickness H1 of the separator 120 (=(D1/H1)×100) is 2% or less. In this case, corrosion of the separator protruding portions 122B caused by oxidation etc. can be reduced more effectively than when the ratio of the protruding length of the protruding portions of the electrically conductive member to its thickness is more than 2%.

B. Modifications

The technique disclosed in the present specification is not limited to the above embodiment, but may be modified into various other forms without departing from the gist thereof. For example, the technique may be modified as described below.

The structure of the unit cell 110 or the fuel cell stack 100 in the above embodiment is merely an example and may be modified into various forms. For example, in the above embodiment, protruding portions (separator protruding portions 122B) may be formed only at the edges around the openings of communication holes 108 formed on the separator lower surface 122 or at the peripheral edges of the separator lower surface 122 that define its outer shape, so no protruding portions may be formed at the opening edges (edges around the openings) or the peripheral edges. The protruding portions may be formed over the entire circumferences of the respective edges or only at part of the edges. The recessed portions (separator recessed portions 123B) may be formed only at the edges around the openings of communication holes 108 formed on the separator upper surface 123 or at the peripheral edges of the separator upper surface 123 that define its outer shape, so no recessed portions may be formed at the opening edges (edges around the openings) or the peripheral edges. The recessed portions may be formed over the entire circumferences of the respective edges or only at part of the edges. In contrast to the above embodiment, recessed portions may be formed on the separator lower surface 122, and protruding portions may be formed on the separator upper surface 123. These modifications are also applicable to the anode-side frame 140 and the interconnectors 150. The interconnectors 150 may not have the thin plate portions 152. In this case, protruding portions may be formed at edges of the lower surface of each interconnector 150 that is in contact with the cathode-side frame 130.

For the electrically conductive members included in the fuel cell stack 100 in the above embodiment, i.e., for the separator 120, the anode-side frame 140, and the interconnectors 150, the larger the thickness, the deeper the recessed portions. However, this is not a limitation. For only a vertically adjacent pair of electrically conductive members among the separator 120, the anode-side frame 140, and the interconnectors 150, the larger the thickness, the deeper the recessed portions may be. The dimensional relation between the thickness of the separator 120, the thickness of the anode-side frame 140, and the thickness of the interconnectors 150 may differ from that of relational formula 1 in the above embodiment. The electrically conductive members to which the present invention is applied may include the end plates 104 and 106 and the cathode-side frame 130 (so long as it is formed of an electrically conductive material). The separator 120, the anode-side frame 140, and the interconnectors 150 are formed of materials with different thermal expansion coefficients. The higher the thermal expansion coefficient of the material forming an electrically conductive member, the deeper the recessed portions of the electrically conductive member may be. In the above embodiment, the anode-side frame 140 has the highest thermal expansion coefficient, and the interconnectors 150 have the second highest thermal expansion coefficient. The separator 120 has the lowest thermal expansion coefficient. However, the depths of the recessed portions satisfy relational formula 2.

The electrically conductive members may include metal members other than the separator 120, the interconnectors 150, the anode-side frame 140, and the end plates 104 and 106.

In at least one of the separator 120, the anode-side frame 140, and the interconnectors 150 in the above embodiment, the protruding length of the protruding portions from the first flat portion may be equal to or larger than the depth of the recessed portions from the second flat portion.

The number of unit cells 110 included in the fuel cell stack 100 in the above embodiment is merely an example. The number of unit cells 110 may be appropriately determined according to, for example, the required output voltage of the fuel cell stack 100. The materials forming the components in the above embodiment are merely examples, and other materials may be used to form these components.

The method for manufacturing the fuel cell stack 100 in the above embodiment is merely an example, and the fuel cell stack 100 may be produced by another production method. For example, in the above embodiment, the protruding portions and recessed portions of the separator 120 etc. are formed by press working, but this is not a limitation. They may be formed by, for example, cutting. In the above embodiment, the intermediate separator protruding portions 122C may be formed into the separator protruding portions 122B by cutting instead of chamfering.

The above embodiment corresponds to an SOFC for generating electricity by utilizing the electrochemical reaction between hydrogen contained in fuel gas and oxygen contained in oxidizer gas; however, the present invention is also applicable to an electrolysis cell unit which is a constitutive unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2016-81813, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," the electricity generation unit 102 may be read as "electrolysis cell unit," and the unit cell 110 may be read as "electrolysis unit cell." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. Consequently, the electrolysis of water occurs in the electrolysis cell units, whereby hydrogen gas is generated in the anode chambers 176, and hydrogen is discharged to the outside of the electrolysis cell stack through the communication hole 108. In the case of the electrolysis cell stack having the aforementioned structure as well, when the plurality of electrically conductive members are formed such that the larger the thickness, the deeper the recessed portion, it is possible to prevent the interference between adjacent electrically conductive members, while preventing a reduction in strength etc. of the electrically conductive members.

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 104, 106: end plate; 108: communication hole; 110: unit cell; 112: electrolyte layer; 114: cathode; 116: anode; 120: separator; 120P: intermediate separator; 121: hole; 122: separator lower surface; 122A: separator lower flat portion; 122B: separator protruding portion; 122C: intermediate separator protruding portion; 123: separator upper surface; 123A: separator upper flat portion; 123B: separator recessed portion; 124: bonding layer; 130: cathode-side frame; 131: hole; 132: oxidizer gas supply communication hole; 133: oxidizer gas discharge communication hole; 134: cathode-side current collector; 135: current collector element; 140: anode-side current collector; 141: hole; 142: fuel gas supply communication hole; 143: fuel gas discharge communication hole; 144: anode-side current collector; 145: electrode facing portion; 146: interconnector facing portion; 147: connection portion; 148: frame lower surface; 148A: frame lower flat portion; 148B: frame protruding portion; 149: spacer; 150: interconnector; 152: thin plate portion; 152A: annular portion; 152B: peripheral edge portion; 154: interconnector lower surface; 154A: interconnector lower flat portion; 154B: interconnector protruding portion; 156: interconnector upper surface; 156A: interconnector upper flat portion; 156B: interconnector recessed portion; 161: oxidizer gas introduction manifold; 162: oxidizer gas discharge manifold; 166: cathode chamber; 171: fuel gas introduction manifold; 172: fuel gas discharge manifold; 176: anode chamber; 180: frame upper surface; 180A: frame upper flat portion; 180B: frame recessed portion; 410, 420: welded portion; BU: protrusion; D1: protruding length; D2: depth; D3: protruding length; D4: depth; D5: protruding length; D6: depth; FG: fuel gas; FOG: fuel offgas; H1 to H3: thickness; L1: virtual straight line; M1: first virtual plane; M2: second virtual plane; M3: third virtual plane; M4: fourth virtual plane; OG: oxidizer gas; 00G: oxidizer offgas; SP: space

The invention claimed is:

1. An electrochemical reaction cell stack comprising:
    a plurality of unit cells each including an electrolyte layer and each further including a cathode and an anode that face each other in a first direction with the electrolyte layer therebetween, the plurality of unit cells being arranged in the first direction; and
    a plurality of flat plate-shaped electrically conductive members that are electrically conductive and arranged in the first direction,
    wherein the plurality of electrically conductive members comprise
    a first electrically conductive member having a first surface located on a first side in the first direction, the first surface including a first flat portion having a flat shape and a protruding portion that is located closer to an edge of the first surface than the first flat portion and protrudes from the first flat portion toward the first side in the first direction and
    a second electrically conductive member located on the first side of the first electrically conductive member in the first direction, the second electrically conductive member having a second surface facing the first surface of the first electrically conductive member, the second surface including a second flat portion having a flat shape and a recessed portion that faces the protruding portion of the first electrically conductive member and is recessed from the second flat portion toward the first side in the first direction,
    wherein the thickness of the second electrically conductive member in the first direction is larger than the thickness of the first electrically conductive member in the first direction, and the depth of the recessed portion from the second flat portion of the second electrically conductive member in the first direction is larger than the protruding length of the protruding portion from the first flat portion of the first electrically conductive member in the first direction.

2. An electrochemical reaction cell stack according to claim 1, wherein the distance between the protruding portion of the first electrically conductive member and the recessed portion of the second electrically conductive member in the first direction increases toward the edge of the first surface.

3. An electrochemical reaction cell stack according to claim 1, wherein the plurality of electrically conductive members further comprise:
   a third electrically conductive member having a third surface located on the first side in the first direction, the third surface including a third flat portion having a flat shape and a protruding portion that is located closer to an edge of the third surface than the third flat portion and protrudes from the third flat portion toward the first side in the first direction; and
   a fourth electrically conductive member located on the first side of the third electrically conductive member in the first direction, the fourth electrically conductive member having a fourth surface facing the third surface of the third electrically conductive member, the fourth surface including a fourth flat portion having a flat shape and a recessed portion that faces the protruding portion of the third electrically conductive member and is recessed from the fourth flat portion toward the first side in the first direction, and
   wherein the thickness of the second electrically conductive member in the first direction differs from the thickness of the fourth electrically conductive member in the first direction, and the depth of the recessed portion of a thicker one of the second electrically conductive member and the fourth electrically conductive member in the first direction is larger than the depth of the recessed portion of the other in the first direction.

4. An electrochemical reaction cell stack according to claim 1, wherein the ratio of the depth of the recessed portion in the first direction to the thickness of the second electrically conductive member in the first direction is 7% or more.

5. An electrochemical reaction cell stack according to claim 1, wherein the ratio of the protruding length of the protruding portion in the first direction to the thickness of the first electrically conductive member in the first direction is 2% or less.

6. An electrochemical reaction cell stack according to claim 1, wherein a gas passage extending in the first direction is formed in the first electrically conductive member, and
   wherein the edge of the first surface faces the gas passage.

7. An electrochemical reaction cell stack according to claim 1, wherein the electrolyte layer contains a solid oxide.

8. An interconnector-electrochemical reaction unit cell composite body comprising:
   a unit cell including an electrolyte layer and further including a cathode and an anode that face each other in a first direction with the electrolyte layer therebetween; and
   a plurality of flat plate-shaped electrically conductive members that are electrically conductive and arranged in the first direction,
   wherein the plurality of electrically conductive members comprise
   a separator having a through hole formed therein, the separator having a portion surrounding the through hole, the portion being joined to a peripheral edge of the unit cell, the separator separating a cathode chamber to which the cathode is exposed from an anode chamber to which the anode is exposed,
   an interconnector disposed on one side of the unit cell where the cathode or the anode is present, and
   a frame member disposed between the separator and the interconnector,
   wherein a first surface of the separator that is located on a frame member side includes a first flat portion having a flat shape and a protruding portion that is located closer to an edge of the first surface than the first flat portion and protrudes from the first flat portion toward the frame member side,
   wherein a second surface of the frame member that is located on a separator side includes a second flat portion having a flat shape and a recessed portion that faces the protruding portion of the separator and is recessed from the second flat portion toward a side opposite to the separator, and
   wherein the thickness of the frame member in the first direction is larger than the thickness of the separator in the first direction, and the depth of the recessed portion of the frame member from the second flat portion in the first direction is larger than the protruding length of the protruding portion of the separator from the first flat portion in the first direction.

9. An interconnector-electrochemical reaction unit cell composite body according to claim 8, wherein the electrolyte layer contains a solid oxide.

10. A method for manufacturing an electrochemical reaction cell stack including a plurality of unit cells arranged in a first direction and a plurality of flat plate-shaped electrically conductive members having electric conductivity and arranged in the first direction, each of the plurality of unit cells including an electrolyte layer and further including a cathode and an anode that face each other in the first direction with the electrolyte layer therebetween, the method comprising:
   a preparation step of preparing the plurality of electrically conductive members by press working, each of the electrically conductive members having a first surface located on a first side in the first direction and a second surface located on a second side in the first direction, the first surface including a first flat portion having a flat shape and a protruding portion that is located closer to an edge of the first surface than the first flat portion and protrudes from the first flat portion toward the first side in the first direction, the second surface including a second flat portion having a flat shape and a recessed portion recessed from the second flat portion toward the first side in the first direction;
   a working step of subjecting the protruding portion of each of the electrically conductive members to working such that the protruding length of the protruding portion from the first flat portion in the first direction is reduced; and
   an arrangement step of arranging the plurality of electrically conductive members in the first direction such that the protruding portion of the first surface of one of two adjacent electrically conductive members of the plurality of electrically conductive members faces the recessed portion of the second surface of the other one of the two adjacent electrically conductive members.

* * * * *